| United States Patent [19] | [11] 3,892,526 |
|---|---|
| Lofquist et al. | [45] July 1, 1975 |

[54] TERTIARY ALKANOLAMINES TO REDUCE OZONE FADING OF DYED POLYAMIDE FIBERS

[75] Inventors: Robert Alden Lofquist; Peter Reginald Saunders, both of Richmond, Va.

[73] Assignee: Allied Chemical Corporation, Petersburg, Va.

[22] Filed: Oct. 30, 1972

[21] Appl. No.: 302,384

[52] U.S. Cl. ............................ 8/165; 8/74; 8/115.6; 8/DIG. 7; 8/DIG. 21; 252/8.8; 117/139.5 A; 117/138.8 N
[51] Int. Cl. ............................................. D06p 5/02
[58] Field of Search ........ 8/74, 165, 115.6, :DIG. 7, 8/DIG. 21; 252/8.8; 117/139.5 A, 138.8 N

[56] References Cited
UNITED STATES PATENTS
2,132,074 10/1938 Kartaschoff et al. ..................... 8/74
3,794,464 2/1974 Lofquist et al.......................... 8/165

*Primary Examiner*—Stephen J. Lechert, Jr.
*Attorney, Agent, or Firm*—Richard A. Anderson

[57] ABSTRACT

When from about 0.3 to about 8% of tertiary amines formed by the reaction between I.
   A. a monoepoxide of greater than four carbons but not styrene oxide and
   B. a primary amine, a diprimary amine, a secondary amine, a disecondary amine, a primary-secondary diamine, a primary-tertiary diamine, a secondary-tertiary diamine, a polyamine, and ammonia; or II.
   A. an alkyl monoepoxide of four or fewer carbons or styrene oxide, and
   B. a secondary amine, a disecondary amine, a secondary-tertiary diamine, a primary-tertiary diamine, or a polyamine having greater than two carbons per nitrogen or III.
   A. styrene oxide and
   B. ammonia are coated on nylon fiber, or are added to the dyebath improved dyefastness to ozone is obtained compared to an untreated dyed nylon fiber.

3 Claims, No Drawings

TERTIARY ALKANOLAMINES TO REDUCE OZONE FADING OF DYED POLYAMIDE FIBERS

CROSS REFERENCE TO RELATED APPLICATIONS

This application is a companion case to an application filed by Robert Alden Lofquist, Ser. No. 302,385, filed Oct. 30, 1972, even date with this application and herewith incorporated by reference. Also, see Ser. No. 223,772, now U.S. Pat. No. 3,794,464, filed Feb. 4, 1972 now abandoned; Ser. No. 226,224, filed Feb. 14, 1972 now abandoned; Ser. No. 240,812, filed Apr. 3, 1972 now U.S. Pat. No. 3,859,045; Ser. No. 211,695, filed Dec. 23, 1971 now abandoned; and Ser. No. 203,414, filed Nov. 30, 1971.

BACKGROUND OF THE INVENTION

The object of this invention is to reduce or prevent the fading of dyed nylon fabrics caused by the presence of ozone. By fading is meant the decrease in concentration of a dye in the fiber such that the fiber becomes less intensely colored or changes color, for example, dark blue to light blue, or green to yellow because of the loss of a blue dye.

Ozone is normally present in air at sea level at concentrations of about one to five parts per hundred million. Despite this extremely low concentration, severe fading, caused by ozone, has been observed.

Ozone is an allotropic form of oxygen. The molecule of ordinary oxygen consists of two atoms of oxygen whereas the molecule of ozone is formed from three atoms of oxygen. Ozone is created in the upper atmosphere by the action of high energy radiation from the sun splitting oxygen molecules into separate oxygen atoms. The individual atoms then combine with diatomic oxygen molecules ($O_2$) to form triatomic ozone ($O_3$). This ozone then diffuses down through the atmosphere.

Ozone is a vigorous electrophilic reagent, that is, it acts by sharing electrons which previously belonged exclusively to another molecule (see C. K. Ingold's "Structure and Mechanism in Organic Chemistry", Cornell University Press, 1953, page 201). An example of this sharing is the attack of ozone on a carbon-carbon double bond to form an ozonide.

When ozone attacks a dye, it can attack at a double bond in the dye or at an amine nitrogen, or other sites where there are electron pairs available. The dyes which are attacked are usually anthraquinone type dyes. Lebensaft in his doctoral dissertation (University of North Carolina at Greensboro, 1970) stated that ozone attacks the anthraquinone nucleus to form derivatives of phthalic acid.

Disperse type dyes and cationic dyes are those most frequently attacked, but under severe conditions, it is believed that almost all dyes are affected by ozone.

It is believed that the dye diffused through the fiber to contact the ozone at the surface of the fiber, rather than ozone diffusing through the fiber to a relatively immobile dye. Part of the evidence for this is that any physical treatment to the fiber that increases the mobility of the dye, increases its ozone fading. For this reason, it is felt that any protective agent must also be able to diffuse through the fiber, if it does not form an impenetrable film on the surface of the fiber.

There is some evidence that water molecules must be present in the nylon fiber in order for ozone fading to take place, but whether its action is that of a swelling agent or it is involved in a primary or secondary oxidation step is unclear. Lebansaft, cited above, believes it functions principally as a swelling agent and a carrier.

Ozone fading can be decreased by reduction of the specific surface of the yarn. This reduction is undesirable in end-uses that need a bulky yarn. Ozone fading also can be diminished by changes in polymer morphology and orientation, but these techniques are inherently expensive.

SUMMARY OF THE INVENTION

A method and composition have been found for improving the fastness of dyes when exposed to ozone in polycarbonamide fibers. The method consists of exposing the fibers to ozone in the presence of a compound selected from the group consisting of compounds having at least one

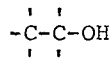

group attached to nitrogen created by the reaction between (A) an alkyl monoepoxide of greater than four carbons, but not styrene oxide and (B) a primary amine, a diprimary amine, a secondary amine, a disecondary amine, a primary-secondary diamine, a primary-tertiary diamine, a secondary-tertiary diamine, a polyamine and ammonia or between (A) an alkyl monoepoxide of four or fewer carbons and/or styrene oxide, and (B) a secondary amine, a disecondary amine, a primary-secondary diamine, a primary-tertiary diamine, or a polyamine having more than two carbons per nitrogen, or between styrene oxide and ammonia.

Primary amines mentioned above include alkyl amines such as hexylamine, alkanolamines such as ethanolamine or tris-(hydroxymethyl)-aminomethane. Diprimary amines include 1,6-hexanediamine, 1,3-diamino-2-hydroxypropane, m-xylylenediamine, bis-(2-aminoethyl)-sulfide, bis-(2-aminopropyl)-piperazine, N,N-bis-(3-aminopropyl)-methylamine, and polyoxypropyleneamines such as Jeffamine D230, from Jefferson Chemical Company.

Polyprimary amines include NC-1999 from Dow Chemical Company, a triamine derived from gylcerine.

Secondary amines include dimethylamine, diethanolamine, N-ethylethanolamine and N-benzylethanolamine.

Secondary-secondary diamines include N,N'-dimethyl-ethylene diamine, 1,3-di-(4-piperidyl)-propane, and piperazine.

Primary-secondary diamines include N-(2-aminoethyl)-piperazine, N-($\beta$-hydroxyethyl)-1,3-diaminopropane, aminoethylethanolamine, and N-methyl-1,3-propanediamine.

Primary-tertiary diamines include N,N-dimethylaminopropylamine, N-(3-aminopropyl)-diethanolamine, N-(3-aminopropyl)-piperidine.

Polyamines include bis-(2-aminopropyl)-amine, N-(2-aminoethyl)-1,4-butanediamine, and polypropyleneamine.

Monoepoxides include ethylene oxide; 1,2-epoxybutane, $\alpha$-methylstyrene oxide; cyclohexene oxide; phenyl glycidyl ether; and commercial monoepoxides such as Proctor and Gamble Epoxide No. 7, a mixture of epoxides of $\alpha$-olefins.

The reaction between amines having an N—H bond and compounds having the

structure creates new compounds having the structure

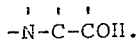

Schecter, Wynstra and Kurkjy reported in Volume 48, No. 1, pages 94–97 of *Industrial and Engineering Chemistry* that primary amines and phenyl glycidyl ether react together to form β-hydroxy alkyl amines almost quantitatively. They found that the reaction between equimolar amounts of phenyl glycidyl ether and diethanolamine was so exothermic that the experiment was uncontrollable, but analysis showed that the epoxide was completely consumed and the theoretical amount of tertiary amine had been formed.

Chapman, Isaacs and Parker in the *Journal of the Chemical Society Transaction* Volume 1950, pp. 1925–34 reported that the mechanism is a simple second order nucleophilic displacement of oxygen by the nitrogen, usually on the carbon with the fewest substituents, i.e., most hydrogens. They feel it is probably due to steric factors, there being more room for the bulky secondary amine where there are fewer or smaller substituents.

Iwakura and Matsuzaki reported in Kobunshi Kagaku, Volume 17, pp. 703–9 (1960) that primary amines act a difunctional compounds and primary diamines as tetrafunctional compounds in their reactions with epoxides.

The reaction between the epoxides and amines does not occur in the absence of polar solvents when the amine compound does not have hydroxyl substituents. For this reason, and to moderate any exotherm, all the reactions listed in the examples were conducted in water or an alcohol. Schecter, Wynstra and Kurkjy, quoted above, found that the hydrogen donor, i.e., the alcohol or water, does not end up as part of the product.

The product of the above reactions or mixtures of the above compounds can be coated on nylon fiber before or after dyeing, or in the dyebath in amounts of from about 0.1 to about 8%, preferably 0.3 to about 4% on the weight of the fiber.

The rate of fading of the dye or dyes, especially disperse or cationic dyes, is substantially reduced by the incorporation or coating of these β-hydroxy alkyl amine compounds. These compounds are effective without discoloring the yarn and with little or no effect on the shade of the dyed fiber.

DESCRIPTION OF THE PREFERRED EMBODIMENTS

Some of the preferred embodiments of this invention are set forth in the following examples. The method of testing the degree of, or sensitivity to, ozone fading was similar to the AATCC 129-1968 test method set forth on page 334/15 of the *Journal of the American Association of Textile Chemists and Colorists*, July 30, 1969, Volume 1, No. 16, in an article entitled, "A New Test Method For Ozone Fading at High Humidity", by Victor S. Salvin.

EXAMPLE 1

The following are examples of the reaction between secondary amines and monoepoxides.

A 250-ml 3-necked round-bottom flask was equipped with a condenser, a dropping funnel and a thermometer. The weight of amine listed below was introduced and 100 ml of the solvent listed below. The solution was stirred by means of a magnetic stirrer. The epoxide was put in the dropping funnel, and added with vigorous stirring at the rate of about three drops per second.

When all the epoxide was added, the flask was heated to reflux and the contents refluxed for one hour. Then the reflux condenser and the separatory funnel removed, and the solvent was removed by distillation under vacuum.

Table for Example 1

| Reaction | Amine | Solvent | Epoxide | Description of Product |
|---|---|---|---|---|
| 1a | 15 gms (0.2 equiv.) 2-(methylamino)-ethanol | 100 cc ethanol | 46.3 gms (0.2 equiv.) Epoxide No.7 | colorless fluid |
| 1b | 15 gms (0.2 equiv.) 2-(methylamino)-ethanol | 100 cc ethanol | 46.3 gms (0.2 equiv.) Epoxide No. 7 | colorless fluid |
| 1c | 23 gms (0.2 equiv.) N-(n-butyl)-ethanolamine | 100 cc ethanol | 72.4 gms (0.2 equiv.) Epoxide No. 45 | white solid |
| 1d | 26.7 gms (0.2 equiv.) diisopropanolamine | 100 cc ethanol | 46.3 gms (0.2 equiv.) Epoxide No. 7 | colorless fluid |
| 1e | 21 gms (0.2 equiv.) diethanolamine | 100 cc ethanol | 41.9 gms (0.2 equiv.) NEDOX 1114 | colorless fluid |
| 1f | 42 gms (0.4 equiv.) diethanolamine | 100 cc ethanol | 41.9 gms (0.2 equiv.) NEDOX 1114 | slightly viscous yellow liquid |
| 1g | 26.6 gms (0.2 equiv.) diisopropanolamine | 100 cc ethanol | 72.4 gms (0.2 equiv.) Expoxide No. 45 | white solid |
| 1h | 26.6 gms (0.2 equiv.) diisopropanolamine | 100 cc ethanol | 49.8 gms (0.2 equiv.) NEDOX 1518 | slightly viscous yellow liquid |
| 1i | 26.6 gms (0.2 equiv.) diisopropanolamine | 100 cc ethanol | 37 gms (0.2 equiv.) Cyclododecane epoxide | light yellow fliud |
| 1j | 22.5 gms (0.2 equiv.) dimethylamine (40% solution) | 100 cc ethanol | 41.9 gms (0.2 equiv.) NEDOX 1114 | 2 phases liquid and solid |

Examples 1d and 1h used ethyl acetate as an inert solvent for the solid Epoxide No. 45. One gram of phenol was used in each of Examples 1c and 1g, as a catalyst for the reaction. NEDOX 1114 is the epoxide of a mixture of $C_{11-14}$ alpha olefins, and NEDOX 1518 is the epoxide of a mixture of $C_{15-12}$ alpha olefins, both made by AMD Chemicals, a division of Ashland Oil and Refining Company.

Epoxide No. 7 and Epoxide No. 45 are alkyl glycidyl ethers with the alkyl groups predominantly $C_8$ and $C_{10}$, and largely $C_{16}$ and $C_{18}$, respectively.

EXAMPLE 2

The following are examples of the reaction between primary amines and epoxides.

The molecules formed in the above reactions vary from one amine nitrogen and two hydroxyls as in the product produced by reaction 2a

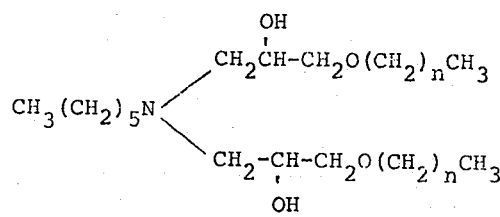

Table For Example 2

| Reaction | Amine | Solvent | Epoxide | Description of Product |
|---|---|---|---|---|
| 2a | 10.1 gms (0.2 equiv.) n-hexylamine | 100 cc ethanol | 46.3 gms (0.2 equiv.) Epoxide No. 7 | colorless viscous liqiud |
| 2b | 7.5 gms (0.2 equiv.) 1-amino-2-propanol | 100 cc ethanol | 41.9 gms (0.2 equiv.) NEDOX 1114 | pale yellow fluid |
| 2c | 7.9 gms (0.15 equiv.) 2-amino-2-methyl-1,3-propanediol | 100 cc ethanol | 34.7 gms (0.15 equiv.) Epoxide No. 7 | colorless viscous liquid |
| 2d | 6.1 gms (0.2 equiv.) ethanolamine | 100 cc water | 41.9 gms (0.2 equiv.) NEDOX 1114 | light yellow fluid |

EXAMPLES 3-4

Example 3 shows the reaction between primary diamines and epoxides.

Example 4 shows the reaction between secondary diamines and epoxides.

where $n$ is 7 to 9, one amine nitrogen and three hydroxyls as in the major product produced by reaction 1i

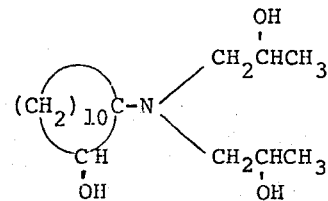

Table for Examples 3 and 4

| Reaction | Amine | Solvent | Epoxide | Description of Product |
|---|---|---|---|---|
| Example 3a | 16.6 gms (0.4 equiv.) hexamethylenediamine (70% solution) | 100 cc ethanol | 92.6 gms (0.4 equiv.) Epoxide No. 7 | colorless viscous liquid |
| Example 3b | 4.5 gms (0.2 equiv.) 1,3-diamino-2-hydroxypropane | 100 cc ethanol | 42.6 gms (0.2 equiv.) NEDOX 1114 | light yellow viscous liquid |
| Example 4a | 5.8 gms (0.1 equiv.) N,N'-diethylethylenediamine | 100 cc ethanol | 24.9 gms (0.1 equiv.) NEDOX 1518 | amber liquid |
| Example 4b | 13.2 gms (0.3 equiv.) N,N'-dimethylethylenediamine | 100 cc ethanol | 31.8 gms (0.3 equiv.) cyclohexane oxide | light yellow liquid |
| Example 4c | 8.6 gms (0.2 equiv.) piperazine | 100 cc ethanol | 42.6 gms (0.2 equiv.) NEDOX 1114 | tan solid |

EXAMPLES 5-7

Example 5 is an example of a primary-tertiary diamine reacted with primary-secondary diamines reacted with monoepoxides.

Example 6 is an example of ammonia reacted with monoepoxides.

Example 7 is an example of a polyamine reacted with a monoepoxide.

The analysis of the cyclohexene oxide by HBr titration is as described in pages 4–17 of Lee & Neville's "Handbook of Epoxy Resins".

or one amine nitrogen and four hydroxyls as in the product of reaction 2c

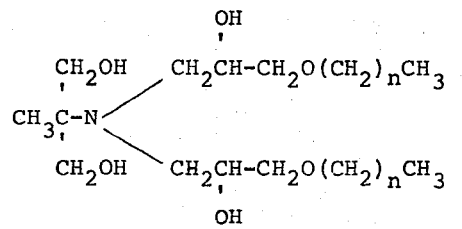

Table for Examples 5-7

| Reaction | Amine | Solvent | Epoxide | Description of Product |
|---|---|---|---|---|
| Example 5a | 7.9 gms (0.2 equiv.) N-92-hydroxyethyl)-1,3-diaminopropane | 100 cc ethanol | 42.6 gms (0.2 equiv.) NEDOX 1114 | light liquid |
| Example 5b | 13.0 gms (0.2 equiv.) N,N-dimethyl-1,3-diaminopropane | 100 cc ethanol | 42.6 gms (0.2 equiv.) NEDOX 1114 | yellow liquid |
| Example 5c | 12.2 gms (0.15 equiv. N-(3-aminopropyl)-diethanolamine | 100 cc ethanol | 32 gms (0.15 equiv.) NEDOX1114 | light yellow liquid |
| Example 6a | 7.6 cc of 28% ammonia (0.33 equiv.) | 100 cc ethanol | 46.3 gms (0.2 equiv.) Epoxide No. 7 | cloudy colorless liquid |
| Example 6b | 7.6 cc of 28% ammonia (0.33 equiv.) | 100 cc ethanol | 41.9 gms (0.2 equiv.) NEDOX 1114 | cloudy light yellow liquid |
| Example 7 | 13.1 gms bis(2-aminopropyl)-amine | 100 cc ethanol | 53 gms cyclohexene-oxide (0.5 equiv.) | viscous liquid | where $n$ is 7 to 9. Other products have up to three basic nitrogens and five hydroxyls, and up to four nitrogens and twelve hydroxyls.

The "Handbook of Epoxy Resins" by H. Lee and K. Neville, McGraw-Hill Book Company, New York, 1967, is a useful reference, especially Chapter 5, "Epoxy-Resin Curing Mechanisms". Chapters 7, 8 and 9 describe primary and secondary amines which can be reacted with epoxides. Chapter 4 includes a table of commercially available epoxy resins, that is, monoepoxides, diepoxides, and polyepoxides.

The chemicals made by the reactions described above were tested on dyed sleeves, by coating the sleeves with the chemicals, exposing the sleeves to ozone and then measuring the loss of color. Details are given in the examples below.

EXAMPLE 8

Cationic dyeable polycaprolactam was made having a formic acid relative viscosity (FAV) of about 60, and containing about 90 equivalents of sulfonate pendant to the polymer chain, the sulfonates being provided by the introduction of 5-sulfoisophthalic acid sodium salt to the monomer prior to polymerization. The polymer had about 80 gram-equivalents of carboxyls and about 20 gram-equivalents of amines per $10^6$ grams of polymer. The polymer was spun at 280°C., plied and drawn at a draw ratio of 3.0, then chopped into 7-inch lengths, carded, and spun into staple yarn with a cotton count of 2.0. Each filament of the yarn had a Y-cross section with a 3.2 modification ratio. The yarns were knitted into sleeves, and autoclaved by steaming in an autoclave at 230°F. for 5 minutes, followed by three 10-minute cycles of steam treatment at 280°F. This steam treatment is used to simulate the twist setting that such yarns receive when they are used in shag carpets, for example.

The sleeve was then dyed to a moss green in a dye-bath, containing 0.3 percent (O.W.F.) Sevron Yellow 8 GMF, (CI Basic Yellow 53), 0.25% Astrazon Blue 3RL, (C.I. Basic Blue 47), 2% Hypochem PND-11, 1% Hypochem CDL-60, and enough mono- and/or disodium phosphate to adjust the pH to neutral.

The sleeves were cut into 5-inch long segments, weighed, and then soaked in ethanol solutions of the following reaction products for 20 minutes. The sections of sleeve were then dried in air for about 16 hours, weighed to determine the pickup of the reaction product and then exposed to three cycles of 80 pphm ozone at 104°F., and a relative humidity of at least 95%. The solutions coated on the sleeves, the percent pickup of the chemicals and the result of three cycles of ozone exposure are listed below:

| | Solution in 200 ml ethanol | % Pickup | ΔE |
|---|---|---|---|
| a) | 1 gm product of reaction 1d | 1.4 | 10.9 |
| b) | 2 gms product of reaction 1d | 2.7 | 3.0 |
| c) | 1 gm product of reaction 1a | 1.3 | 5.3 |
| d) | 2 gms product of reaction 1a | 2.2 | 4.1 |
| e) | Control, just 200 ml ethanol | 0 | 31.2 |

A cycle is that amount of exposure which occurs when a nylon control fabric shows a specified color change as measured by a colorimeter.

The control fabric is a nylon sleeve dyed Olive 1, a tertiary shade given by a dye bath containing 0.69% (O.W.F.) C.I. Disperse Blue 3, (such as Celliton Blue FFRN), 0.0807% (O.W.F.) Celliton Pink RF (C.I. Disperse Red 4), and 0.465% (O.W.F.) C.I. Disperse Yellow 3 (Celliton Yellow GA). Disperse Blue 3 dye is especially sensitive to ozone.

The degree of fading after exposure to ozone was measured on a Hunter Color Difference Meter. The measurement is given in terms of ΔE units, a smaller ΔE being associated with less fading. ΔE is calculated from the differences between the L, $a$, and $b$ readings before the yarn is exposed to ozone, and the L, $a$, and $b$ readings after the yarn is exposed to ozone, using the equation:

$$\Delta E = \sqrt{(\Delta L)^2 + (\Delta a)^2 + (\Delta b)^2}$$

L is a 0–100 reading of black to white; "a" measures redness to greenness; and $b$ measures yellowness to blueness.

The Hunter Color Difference Meter is believed to measure color, as seen in average day light, in a manner similar to the way in which the human eye responds to color. Experimentation has shown that the eye can match any color with a combination of three "primary" colored lights, and, therefore, that any color can be specified by a three-dimensional identification. The Color Difference Meter measures the light reflected by a specimen through filters that correspond to the three primary lights. The measurements made, therefore, correspond to the way the average human eye responds to light, as these responses are set forth in the CIE "Standard Observer". The Standard Observer is a table of values derived from experiments with human observers, and recommended for use in 1931 by the International Commission on Illumination.

EXAMPLE 9

Sleeves identical to those of Example 8, but autoclaved at 260°F., rather than at 280°F., were cut into sections, soaked in the following solutions and then exposed to ozone using the method of Example 8.

| Solution in 200 ml ethanol | % Pickup | ΔE |
|---|---|---|
| a) 1 gm product of reaction 1e | 0.4 | 3.4 |
| b) 2 gms product of reaction 1e | 1.3 | 1.6 |
| c) 1 gm product of reaction 3a | 0.2 | 5.2 |
| d) 2 gms product of reaction 3a | 1.1 | 3.6 |
| e) 1 gm product of reaction 2a | 0.2 | 8.1 |
| f) Control, just 200 ml ethanol | 0 | 22.0 |

EXAMPLE 10

Sleeves identical to those of Example 9, i.e., cationic dyeable nylon autoclaved at 260°F., were cut into sections, soaked in the following solutions, and then exposed to ozone using the method of Example 8.

| Solution in 200 ml ethanol | % Pickup | ΔE |
|---|---|---|
| a) 1 gm product of reaction 1j, solid phase | 1.4 | 13.5 |
| b) 2 gms product of reaction 1j, solid phase | 1.5 | 10.4 |
| c) 1 gm product of reaction 1j, liquid phase | 1.2 | 9.9 |
| d) 2 gms product of reaction 1j, liquid phase | 2.2 | 4.5 |

EXAMPLE 10 -Continued

| Solution in 200 ml ethanol | % Pickup | ΔE |
|---|---|---|
| e) 1 gm product of reaction 2b | 1.3 | 5.5 |
| f) 2 gms product of reaction 2b | 1.9 | 4.6 |
| g) 2 gms product of reaction 2a | 1.9 | 4.8 |
| h) Control, just 200 ml ethanol | 0 | 20.4 |

EXAMPLE 11

Sleeves identical to those of Example 9, i.e., cationic dyeable nylon, autoclaved at 260°F., were cut into sections, soaked in the following solutions and then exposed to ozone as in Example 8.

| Solution in 200 ml ethanol | % Pickup | ΔE |
|---|---|---|
| a) 1 gm product of reaction 2c | 1.5 | 12.8 |
| b) 2 gms product of reaction 2c | 2.9 | 8.1 |
| c) 1 gm product of reaction 4a | 0.8 | 10.3 |
| d) Control, just 200 ml ethanol | 0 | 23.9 |

EXAMPLE 12

Sleeves identical to those of Example 9, i.e., cationic dyeable nylon, autoclaved at 260°F., were treated as in Example 8 after soaking in the following solutions:

| Solution in 200 ml ethanol | % Pickup | ΔE |
|---|---|---|
| a) 2 gm product of reaction 4a | 1.4 | 10.7 |
| b) 1 gm product of reaction 4b | 0.5 | 20.6 |
| c) 2 gms product of reaction 6b | 0.8 | 16.8 |
| d) 1 gm product of reaction 1b | 1.5 | 11.6 |
| e) 2 gms product of reaction 1b | 2.4 | 7.8 |
| f) Control, just 200 ml ethanol | 0 | 23.9 |

EXAMPLE 13

Sleeves identical to those of Example 8, except that they were autoclaved at 270°F., were cut into sections, soaked in the following solutions, and then exposed to ozone as in Example 8.

| Solution in 200 ml ethanol | % Pickup | ΔE |
|---|---|---|
| a) 1 gm product of reaction 1f | 2.2 | 2.8 |
| b) 1 gm product of reaction 1g | 1.7 | 0.7 |
| c) 1 gm product of reaction 1c | 1.6 | 0.2 |
| d) Control, just 200 ml ethanol | 0 | 26.7 |

EXAMPLE 14

Sleeves identical to those of Example 12 were cut into sections, soaked in the following solutions, and then exposed to ozone, as in Example 8.

| Solution in 200 ml ethanol | % Pickup | ΔE |
|---|---|---|
| a) 1 gm product of reaction 1h | 3.6 | 4.0 |
| b) 1 gm product of reaction 3b | 1.1 | 9.3 |
| c) 1 gm product of reaction 4a | 1.7 | 1.6 |
| d) 1 gm product of reaction 5a | 1.3 | 3.3 |
| e) 1 gm product of reaction 5c | 1.7 | 3.7 |
| f) Control, just 200 ml ethanol | 0 | 27.1 |

EXAMPLE 15

Sleeves identical to those of Example 8 were cut into sections, soaked in the following solutions, and then exposed to ozone, as in Example 8.

| Solution in 200 ml ethanol | % Pickup | ΔE |
|---|---|---|
| a) 1 gm product of reaction 1i | 1.2 | 7.8 |
| b) 1 gm product of reaction 4b | 1.4 | 2.2 |
| c) 1 gm product of reaction 2d | 1.1 | 4.3 |
| d) Coated, just 200 ml ethanol | 0 | 21.5 |

EXAMPLE 16

Light dyeing polycaprolactam was made having a formic acid relative viscosity (FAV) of about 67. The polymer had about 70 gram-equivalents of carboxyls and about 17 gram-equivalents of amines per $10^6$ grams of polymer. The polymer was spun, plied, drawn, chopped into staple, carded and spun into staple yarn and autoclaved as described in Example 8, but at 260°F., instead of 280°F.

The autoclaved yarns were dyed Olive 1 whose dyebath recipe is described in Example 8.

The dyed yarns were coated with solutions of the chemical, given below, and tested, and the fading was measured in the same manner as described in Example 8.

| Solution in 200 ml ethanol | % Pickup | ΔE |
|---|---|---|
| a) 1 gm product of reaction 1e | 0.7 | 8.4 |
| b) 2 gms product of reaction 1e | 2.3 | 4.8 |
| c) Control, just 200 ml ethanol | 0 | 27.8 |

EXAMPLE 17

Sleeves identical to those of Example 8 were cut into sections, soaked in the following solutions, and then exposed to ozone as in Example 8. The coatings and the results of exposure are listed below.

| Solution in 200 ml ethanol | % Pickup | ΔE |
|---|---|---|
| a) 0.5 gm product of reaction 1e | 0.8 | 7.2 |
| b) 0.7 gm product of reaction 1e | 0.7 | 10.9 |
| c) 1 gm product of reaction 1e | 1.4 | 5.9 |
| d) 1.3 gm product of reaction 1e | 1.8 | 5.1 |
| e) 1.8 gm product of reaction 1e | 2.6 | 4.0 |
| f) Control, just 200 ml ethanol | 0 | 27.3 |

EXAMPLE 18

Sleeves identical to those of Example 8 were cut into sleeves, soaked in the following solutions and then exposed to ozone as in Example 8. The coatings and the results of exposure are listed below.

| Solution in 200 ml ethanol | % Pickup | ΔE |
|---|---|---|
| a) 1 gm product of reaction 4c | 1.7 | 6.2 |
| b) 1 gm product of reaction 5b | 0.8 | 10.2 |
| c) Control, just 200 ml ethanol | 0 | 27.0 |

EXAMPLE 19

The procedure of Example 8 was repeated but using cationic dyeable nylon 6,6 staple (Du Pont T367) instead of cationic dyeable polycaprolactam. The antiozonants used, the amount of pickup of the antiozonant and the result of 3 cycles of ozone exposure are listed below:

| Solution in 200 ml ethanol | % Pickup | ΔE |
|---|---|---|
| Control, 200 ml ethanol | 0 | 4.2 |
| a) 1 gm product of reaction 1d | 1.0 | 1.2 |
| b) 1 gm product of reaction 2d | 0.8 | 0.7 |
| c) 1 gm product of reaction 4a | 0.7 | 2.5 |

We claim:

1. A composition of matter comprising from about 92 to about 99.9% by weight of a polycarbonamide and from about 0.1 to about 8% by weight of a compound coated on said polycarbonamide selected from the group consisting of compounds having at least one

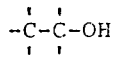

group attached to a nitrogen atom and created by the reaction of

A. a monoepoxide having greater than 4 carbon atoms provided said monoepoxide is not styrene oxide with
   ammonia and/or
   a primary alkyl amine, and/or
   a secondary alkyl amine, and/or
   a primary-secondary alkyl diamine, and/or
   a disecondary alkyl diamine, and/or
   a secondary-tertiary alkyl diamine, and/or
   a primary-tertiary alkyl diamine, and/or
   a diprimary alkyl diamine, and/or
   a polyamine, B. a monoepoxide having four or less carbon atoms and/or styrene oxide with
   a secondary alkyl amine, and/or
   a disecondary alkyl diamine, and/or
   a secondary-tertiary alkyl diamine, and/or
   a primary-tertiary alkyl diamine, and/or
   a polyamine having greater than 2 carbon atoms per nitrogen atom, and C. styrene oxide with ammonia.

2. The composition of claim 1 wherein said compound is created by the reaction of a monoepoxide with a secondary alkyl amine.

3. The composition of claim 1 wherein said compound is created by the reaction of monoepoxide having greater than 4 carbon atoms with a primary alkyl amine.

* * * * *